Figure 1:
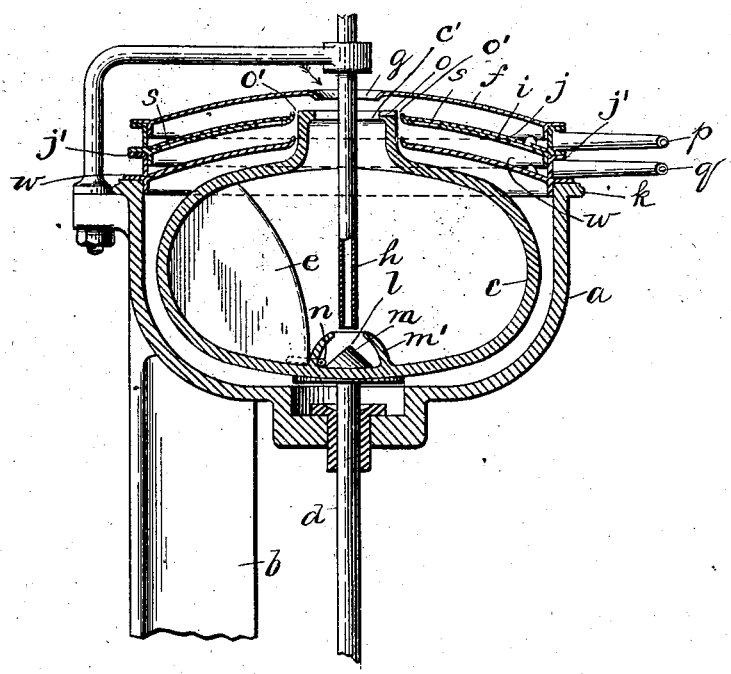

No. 726,134. PATENTED APR. 21, 1903.
J. L. BERGH.
APPARATUS FOR CLARIFYING AND AERATING MILK, &c.
APPLICATION FILED JUNE 2, 1902.
NO MODEL.

Witnesses
Jas N Blackwood

Inventor
Jefferson L Bergh
by M A Doolittle & Son
Attorneys

UNITED STATES PATENT OFFICE.

JEFFERSON L. BERGH, OF COBLESKILL, NEW YORK, ASSIGNOR TO THE BERGH CLARIFIED MILK COMPANY, OF NEW YORK, N. Y.

APPARATUS FOR CLARIFYING AND AERATING MILK, &c.

SPECIFICATION forming part of Letters Patent No. 726,134, dated April 21, 1903.

Application filed June 2, 1902. Serial No. 110,003. (No model.)

*To all whom it may concern:*

Be it known that I, JEFFERSON L. BERGH, a citizen of the United States, residing at Cobleskill, in the county of Schoharie and State of New York, have invented new and useful Improvements in the Apparatus for Clarifying and Aerating Milk, &c., of which the following is a specification.

My invention relates to an apparatus for clarifying and aerating milk without separating the cream from the milk and at the same time condensing the froth produced in the operation of clarifying.

In my Patent No. 607,109, of July 12, 1898, a process and apparatus are described and claimed for the purpose of clarifying, and in my pending allowed application, Serial No. 108,050, are set forth means for condensing the froth produced in the operation.

My present invention consists in combining these two inventions in one apparatus with some important changes, all as hereinafter described and claimed.

In clarifying the milk by the patented process referred to the apparatus is provided with three rotary covered bowls, one within the other, and the milk is introduced into the inner vessel and then given a rotary movement sufficient by the centrifugal action to throw off all the tangible impurities of the milk against the surrounding walls of the bowls, while at the same time the motion is not sufficient to separate the cream from the milk, and the purified milk and cream are drawn off together.

In carrying out my present invention in the apparatus used the inner bowl and the cover referred to are dispensed with, so that the apparatus is made much simpler, and by giving the vessel an open top the additional important step of aerating the milk is accomplished. It is highly desirable of course that all the tangible impurities of the milk—such as dirt, hair, epithelial flakes, and bacteria—be thrown off, and it is also highly desirable that the animal tastes and unpleasant flavors of a vegetable or other origin should be eliminated. This step of aeration I have found to be best accomplished by subjecting the milk during the centrifugal operation to exposure to the open air. This is done in the form of apparatus herein described by removal of the closed top. By this change in the art I have found that not only all obnoxious flavors—such, for instance, as arise from onions, garlic, and certain classes of noxious grass or weeds consumed by the cows—are removed, but a sweetness and agreeable flavor not apparent in the original milk are added thereto. It will be readily seen how this aeration is best and most thoroughly accomplished by subjecting the milk to a current of fresh air during the centrifugal action, which tends to expose every portion of the liquid to the cleansing action of the atmosphere.

In the operation of clarifying, especially where the milk and cream are kept mixed, as in the present process, the rapid rotation of the liquid produces a large amount of froth, which contains milk and the accumulation of which prevents the speedy withdrawal and carrying of the milk for transportation unless the froth is skimmed off or in some other manner eliminated, which results in a large waste of material. To avoid this froth, condensing means already referred to are employed, and which condensing means constitute an important part of my apparatus, as it adds to the quantity of mingled milk and cream and to the speed and success of the entire operation.

The form of apparatus which I have devised for the carrying out of my method above described is illustrated in the accompanying drawings, wherein—

Figure 2:
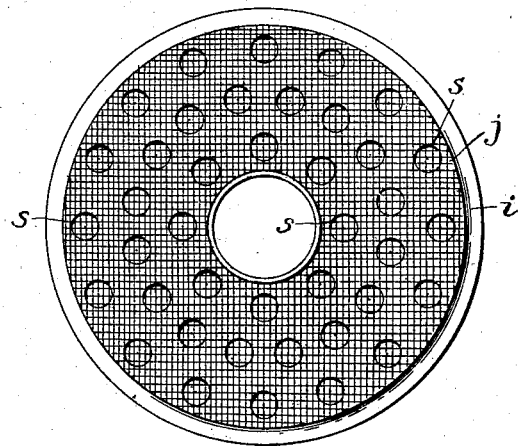

Figure 1 is a vertical central section, and Fig. 2 a plan, of the screen or condensing section of the apparatus.

Referring to the drawings, $a$ is a stationary outside casing mounted on a framework $b$. Within this casing are carried three removable parts or sections: first, a centrifugal rotating bowl-shaped vessel $c$, keyed or otherwise secured to a vertical rotary shaft $d$ and provided with internal wings $e$; second, an annular condensing-chamber $i$, located a short distance below the top of the milk vessel $c$ and entirely surrounding the same and provided at its bottom with a perforated condenser-plate $j$, and, third, an annular chamber $w$, located below the condenser $i$ and for receiving the final product of clarified, aerated, and froth-condensed milk. The condenser-chamber is supported on a flange $j'$ of the bowl $w$.

The rotary bowl $c$ has a neck with an open mouth $c'$ to receive the outer air from the entrance $g$ of the cover and to admit it freely into the body of said bowl. For the purpose also of conducting plenty of fresh air to the annular chambers $i$ and $w$ there is provided a narrow passage $o'$ between the inner ends of said chambers and the neck of the rotary chamber, which communicates with the space at the upper portion of the apparatus, where a constant inflow of outer air from the opening $g$ in the cover is received.

The condensing vessel is provided with air-discharge pipe $p$ and the chamber $w$ with milk-discharge pipe $q$.

A small open receptacle $l$ is at the bottom of the central portion of the vessel $c$, into which the milk is first received from the pipe $h$, which terminates a short distance above it, and which receptacle is provided with a central cone $m$. The purpose of this small receiving-chamber and cone is to give an initial breaking up of the body of milk, churning it out and upward into the rotary surrounding vessel, and by this agitation exposing the milk to a greater extent to the aerating currents of air and to also assist in the clarifying operation.

A channel $n$ is provided on one side of the mouth $c'$ of the rotary bowl $c$, by which the milk is conducted to the condensing vessel.

The operation of the apparatus may be summarized as follows: The milk, as soon as it escapes from the pipe $h$, is met by a current of air from the spaces above, which current is continued into chamber $l$, where the milk is dashed against the walls and by centrifugal action carried up and out of that chamber into rotating bowl $c$. The same force then throws the milk against the wings $e$ of bowl $c$, which wings serve to break up the milk, more effectually expose its particles to the air, and present stops and adhering surfaces for certain impurities of the milk thrown off by the centrifugal action. The milk is then carried up the sides of the bowl $c$, out of its mouth $c'$, into the channel $o$, thence to the condensing vessel $i$, through the perforated condensing-plate $j$, and finally into the receiving-chamber $w$. At all times during the operation the milk is exposed to a current or currents of outer air proceeding from the open cover and drawn in and increased in force by the rotary motion of the receiving vessels. This motion, as before stated, given to the main vessel $c$ also creates quite a large amount of froth on the surface of the milk, which ordinarily impedes the final step of discharge of the milk into proper receptacles. The pipe $p$, leading out of the condenser, serves as an exit for the air received into the apparatus, to aid in the matter of the air circulation, and to carry off the air produced by the breaking of the froth-bubbles in the condensing step. When thus clarified, aerated, and condensed, the milk is discharged into proper receptacles from pipe $q$ in vessel $w$. A small pipe $n$ may be employed as an additional exit from the bottom of the chamber $l$ to the chamber $c$.

It will be noticed that so far as this apparatus is concerned the inner bowl of the Bergh patent is dispensed with and the cover left open, features not before possessed by either of my above-described inventions, and that the condensing feature of my above-mentioned allowed application is readapted to the present form of apparatus.

Having thus described my invention, what I claim is—

1. An apparatus for clarifying and aerating milk, and condensing the froth thereof, comprising, in combination, an outside stationary casing, a cover having an open air-passage for admitting outer air freely into the apparatus, an inner rotary vessel provided with an open air-passage communicating with the said air-passage through the cover, an annular vessel extending around the said rotary vessel, receiving milk therefrom and provided with an air-passage communicating with the open air-passage beneath the cover, also with a perforated portion at the top of the milk-chamber for effecting the condensation of the froth, and a discharge-air passage, and an annular vessel beneath the condenser for receiving the milk therefrom, provided with an air-passage communicating with the above-mentioned air-passages, and with a discharge, substantially as described.

2. In an apparatus for clarifying and aerating milk, and condensing the froth arising in the operation, the combination with an outside stationary casing, a cover for the apparatus having a free open passage to the outer air, an inner rotary clarifying vessel, and an annular vessel around said clarifying vessel, and adapted to receive the milk from said inner rotary vessel, the top of the milk-chamber provided with perforations for condensing the froth in said milk, both said inner and outer vessels provided with air-passages communicating with each other and with the outer air-passage at the top of the apparatus, substantially as described.

In testimony whereof I have signed my name to this specification in the presence of two subscribing witnesses.

JEFFERSON L. BERGH.

Witnesses:
WM. H. GOLDING,
THOMAS E. DORNET.